US012811619B2

(12) United States Patent
Butler

(10) Patent No.: US 12,811,619 B2
(45) Date of Patent: Nov. 24, 2026

(54) BELT CLIP ASSEMBLY AND SYSTEM FOR TRACKING OF PORTABLE RADIOS

(71) Applicant: BearCom Group, Inc., Garland, TX (US)

(72) Inventor: Mike Butler, Garland, TX (US)

(73) Assignee: BearCom Group, Inc., Garland, TX (US)

( * ) Notice: Subject to any disclaimer, the term of this patent is extended or adjusted under 35 U.S.C. 154(b) by 439 days.

(21) Appl. No.: 18/392,476

(22) Filed: Dec. 21, 2023

(65) Prior Publication Data

US 2024/0235598 A1 Jul. 11, 2024

Related U.S. Application Data

(60) Provisional application No. 63/437,319, filed on Jan. 5, 2023.

(51) Int. Cl.
*H04B 1/3827* (2015.01)

(52) U.S. Cl.
CPC ..... *H04B 1/385* (2013.01); *H04B 2001/3855* (2013.01)

(58) Field of Classification Search
None
See application file for complete search history.

(56) References Cited

U.S. PATENT DOCUMENTS

| | | | | |
|---|---|---|---|---|
| 2010/0321196 | A1* | 12/2010 | Cheng | G08B 21/0291 340/686.6 |
| 2014/0320667 | A1* | 10/2014 | Densham | H04N 9/3194 348/169 |
| 2016/0030818 | A1* | 2/2016 | Dean | A63B 57/50 473/408 |
| 2022/0221591 | A1* | 7/2022 | Smith | G06F 1/163 |
| 2022/0322638 | A1* | 10/2022 | Galvez | H04W 4/029 |

FOREIGN PATENT DOCUMENTS

| | | | | |
|---|---|---|---|---|
| CA | 2679680 | A1 * | 10/2008 | A45C 11/002 |
| CA | 3240257 | A1 * | 6/2023 | G06Q 10/30 |
| CN | 102870143 | A * | 1/2013 | G08B 15/004 |
| CN | 208076725 | U * | 11/2018 | |
| FR | 3062535 | A1 * | 8/2018 | H04B 1/385 |
| JP | 2017212695 | A * | 11/2017 | |
| JP | 2020161526 | A * | 10/2020 | |

* cited by examiner

*Primary Examiner* — Mohammed Rachedine
(74) *Attorney, Agent, or Firm* — Ashurst Perkins Coie US LLP

(57) ABSTRACT

A radio tracking system that includes a first portable radio with a first belt clip and a second portable radio with a second belt clip. The first belt clip includes a first tracking chip and a first tracking battery associated therewith. The second belt clip includes a second tracking chip and a second tracking battery associated therewith. The first and second radios are trackable within a first network and the first and second tracking chips are trackable within a second network. The first network is different than the second network.

9 Claims, 5 Drawing Sheets

BELT CLIP ASSEMBLY AND SYSTEM FOR TRACKING OF PORTABLE RADIOS

CROSS-REFERENCE TO RELATED APPLICATIONS

This application claims the benefit of U.S. Provisional Application No. 63/437,319, filed on Jan. 5, 2023, the entirety of which is incorporated by reference herein.

FIELD OF THE INVENTION

The present invention relates to a system for the tracking of portable radios.

BACKGROUND OF THE INVENTION

Portable radios, such as Motorola® radios, are lost regularly by users. Currently, these lost radios can only be tracked when they are powered on. Therefore, if the battery dies or otherwise fails or the radio is turned off, the radio cannot be tracked and may be difficult to find.

The background description includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention there is provided a belt clip assembly that includes a belt clip configured to be used with a portable radio. The belt clip includes a tracking chip and a battery associated therewith. The tracking chip and battery may be embedded in the belt clip. The tracking chip and battery may be attached, connected or secured to the belt clip. The tracking chip and battery may be associated with a tracking module that is attached, connected or secured to a main body portion of the belt clip. The tracking module may be removable from the main body portion.

In accordance with another aspect of the present invention there is provided a radio tracking assembly that includes a portable radio having a belt clip. The belt clip includes a tracking chip and a battery associated therewith. The tracking chip and battery may be attached, connected or secured to the belt clip.

In accordance with another aspect of the present invention there is provided a radio tracking system that includes a first portable radio that includes a first belt clip, and a second portable radio that includes a second belt clip. The first belt clip includes a first tracking chip and a first tracking battery associated therewith. The second belt clip includes a second tracking chip and a second tracking battery associated therewith. The first and second radios are trackable within a first network, the first and second tracking chips are trackable within a second network, and the first network is different than the second network. The first tracking chip and first batter battery are attached, connected or secured to the first belt clip, and the second tracking chip and second batter battery are attached, connected or secured to the second belt clip.

In accordance with another aspect of the present invention there is provided a method that includes securing a belt clip assembly to a portable radio to provide a radio tracking assembly. The belt clip assembly includes a belt clip, a tracking chip and a tracking battery. The tracking chip is powered by the tracking battery. The radio includes a radio battery and the tracking chip is part of a network. The method includes placing the radio tracking assembly in a first location, powering down the radio battery or allowing the radio battery to die, and determining that the radio tracking assembly is at the first location via the network. The method may include removing the OEM belt clip from the portable radio prior to the step of securing the belt clip assembly to the portable radio.

The present invention is directed to a radio tracking system that includes one or more tracking chips and batteries embedded into the belt clip on a portable radio. In a preferred embodiment, the tracking chip remains powered whether the radio itself is powered on or off, and whether the radio battery is working or not. It will be appreciated by those of ordinary skill in the art that the chip should not interfere with the radio operation. Preferably, the system does not require the use of Wi-Fi, Bluetooth beacons or GPS. However, this is not a limitation and in another embodiment, the system can include the use of Wi-Fi, Bluetooth beacons or GPS.

The system also includes a method of locating a misplaced or lost radio or radio tracking assembly. The method may include securing a belt clip assembly to a portable radio to provide a radio tracking assembly. The belt clip assembly includes a tracking chip and a first battery associated therewith. The radio includes a second battery. The tracking chip is part of a network (e.g., a mesh network). The method also includes placing the radio tracking assembly in a first location. This can include losing the radio tracking assembly by dropping it, putting it down and forgetting it, having the radio tracking assembly stolen, etc. The method also includes powering down the second battery. This can include shutting the radio off or the second battery dying. However, at this point in time, the tracking chip is still powered by the first battery. The method also includes determining that the radio tracking assembly is at the first location via the network. In short, this includes locating the radio tracking assembly using the system, as opposed to finding the radio via physically searching for it. The method may also include the step of removing the OEM (original equipment manufacturer) or other prior belt clip (i.e., any belt clip that does not include a battery and tracking chip therein) from the portable radio prior to the step of securing the belt clip assembly to the portable radio.

BRIEF DESCRIPTION OF THE DRAWINGS

The disclosure may be more readily understood by referring to the accompanying drawings in which.

Like numerals refer to like parts throughout the several views of the drawings.

DETAILED DESCRIPTION OF THE PREFERRED EMBODIMENTS

Figure 1:
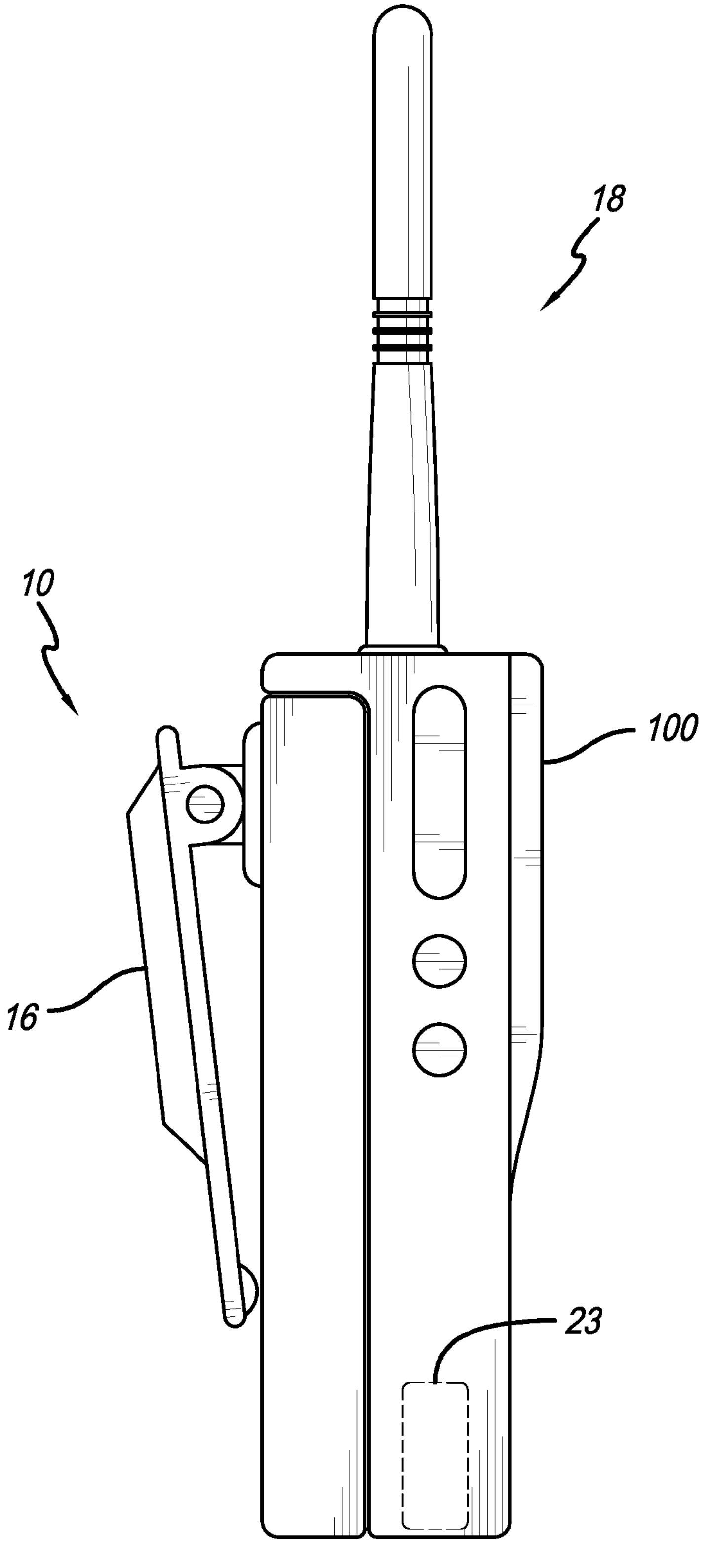
FIG. 1 is a side elevational view of a portable radio that includes a belt clip assembly in accordance with a preferred embodiment of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
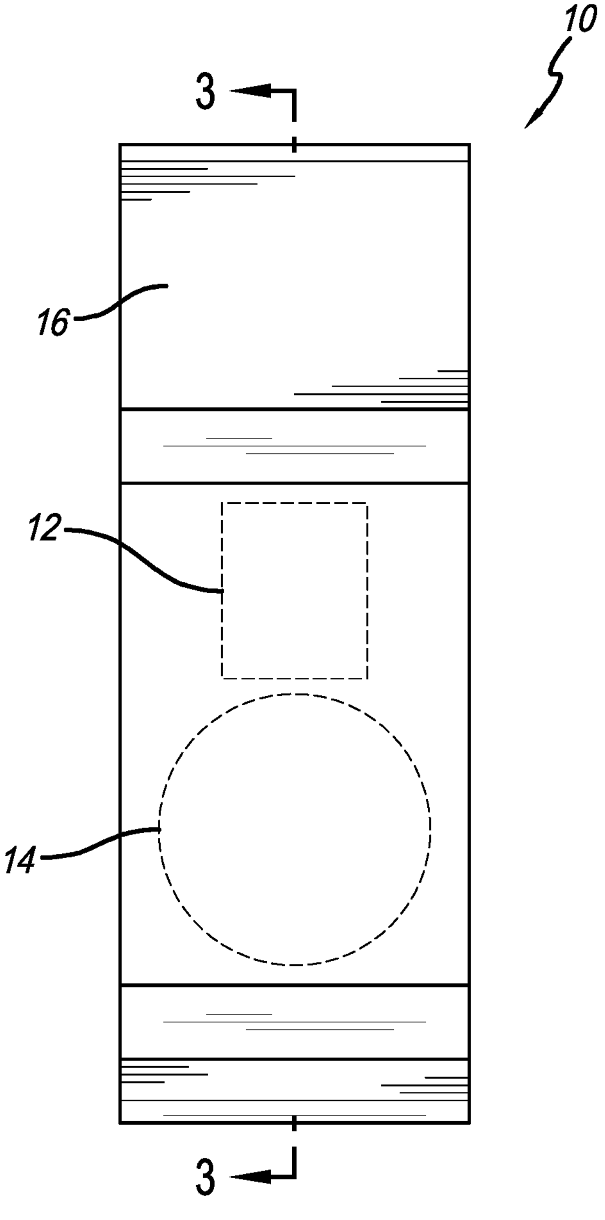
FIG. 2 is a front elevational view of the belt clip assembly.
Figure 3:
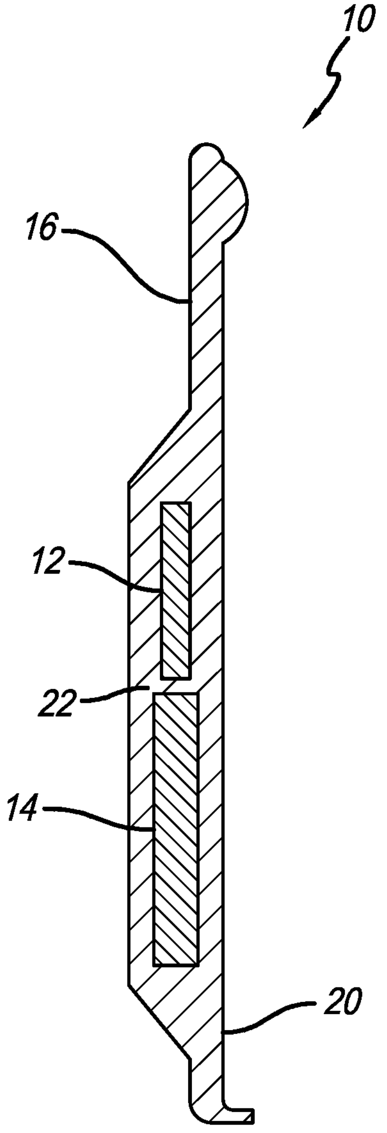
FIG. 3 is a cross-sectional side elevational view of the belt clip assembly.

FIGS. 1-5 are directed to a system for the tracking of portable radios. For example, the system can be used to track one or more of the Motorola® radio 100 shown in FIG. 1. In a preferred embodiment, each radio 100 within the system includes a belt clip assembly 10 secured thereto. As shown in FIGS. 2 and 3, the belt clip assembly 10 may include a tracking chip 12 and a battery 14 associated with a belt clip 16. The battery 14 is included to power the tracking chip 12 (and may be referred to herein as a tracking battery 23). In an exemplary embodiment, the tracking system may use a Wirepas mesh node for IoT (Internet of things) and indoor (or outdoor) tracking. For example, the tracking chip 12 may be a Fujitsu® FWM8BLZ14T IoT Tag that is embedded in or otherwise secured or attached to the belt clip 16, as is shown in FIGS. 2 and 3. The belt clip 16 may take any form. For example, the belt clip 16 may be formed similarly to a PMLN4652 2.5" spring loaded belt clip from a Motorola® portable radio, as shown in FIGS. 2 and 3. Any type of belt clip is within the scope of the present invention.

The belt clip 16 can include a main body portion 20 and an extension portion 22, as shown in FIG. 3. The tracking battery 14 and tracking chip 12 can be disposed in or connected to the main body portion 20 and/or the extension portion 22 (the extension portion may be considered a tracking module, as discussed herein). The tracking chip 12 (e.g., a Fujitsu® Wirepas mesh module) and/or battery 14 may be molded into the plastic of the belt clip 16 (within the main body portion 20 and/or the extension portion 22). In another embodiment, the battery 14 and/or tracking chip 12 may be secured to one or more of the inner or outer face of the belt clip 16.

A radio 100 that includes the belt clip assembly 10 may be referred to herein as a radio tracking assembly 18. In use, the standard belt clip on the radio may be replaced with the inventive belt clip assembly 10 or the radio may be sold originally with the belt clip assembly 10. Preferably, all electronics and power necessary for tracking (in the case of the radio being turned off or radio battery dying) are contained in the belt clip 16. In use, the battery 14 (and, therefore, the tracking chip that is powered by the battery) may have a battery life of 1 to 2 years. In use, the tracking chip 12 remains live or powered whether the radio itself is powered on or off, and whether the radio battery 23 is working or not.

The tracking system includes a plurality of radios 100 that each include a belt clip assembly 10 (a belt clip 16 with both a tracking chip 12 and battery 14 therein). The radios are wirelessly connected within the mesh network so that the radios can be tracked via the tracking chip or member within each belt clip assembly 10. It will be appreciated that the tracking system is independent of the radio network. The use of a mesh network is not a limitation on the present invention. Any type of network is within the scope of the present invention. For example, the network can include a central hub or router.

Figure 4:
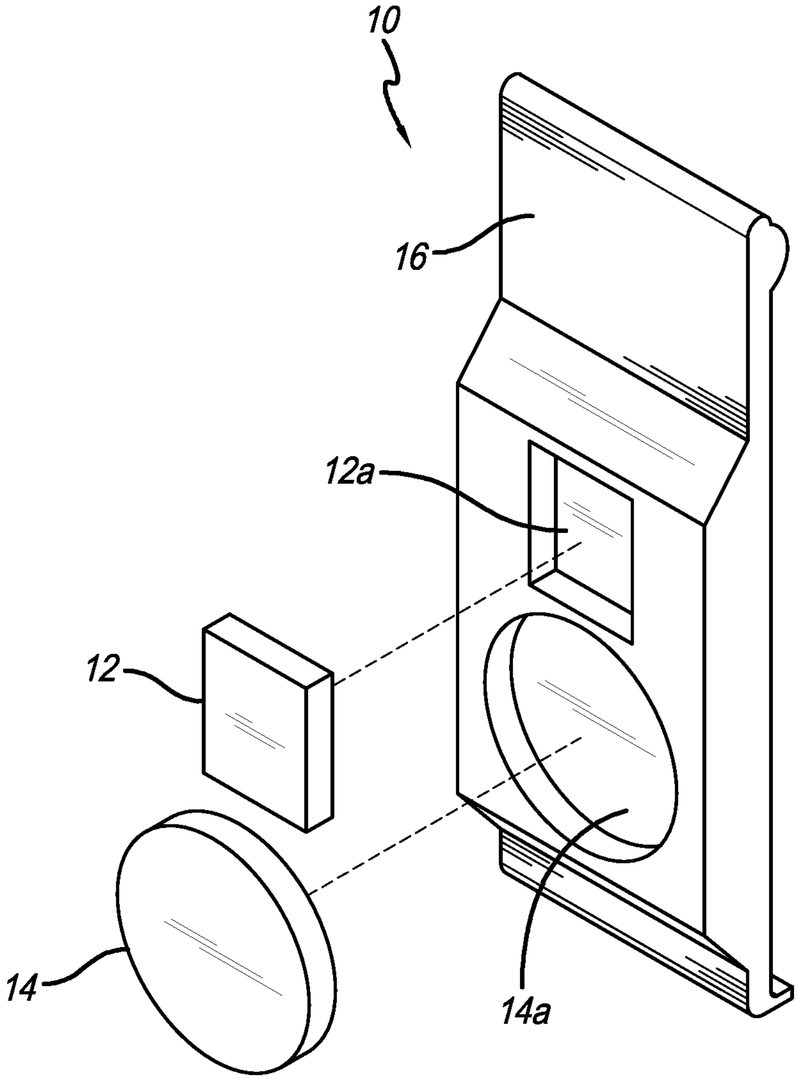
FIG. 4 is an exploded view of a belt clip assembly showing the battery and chip exploded from and removable from the belt clip.
Figure 5:
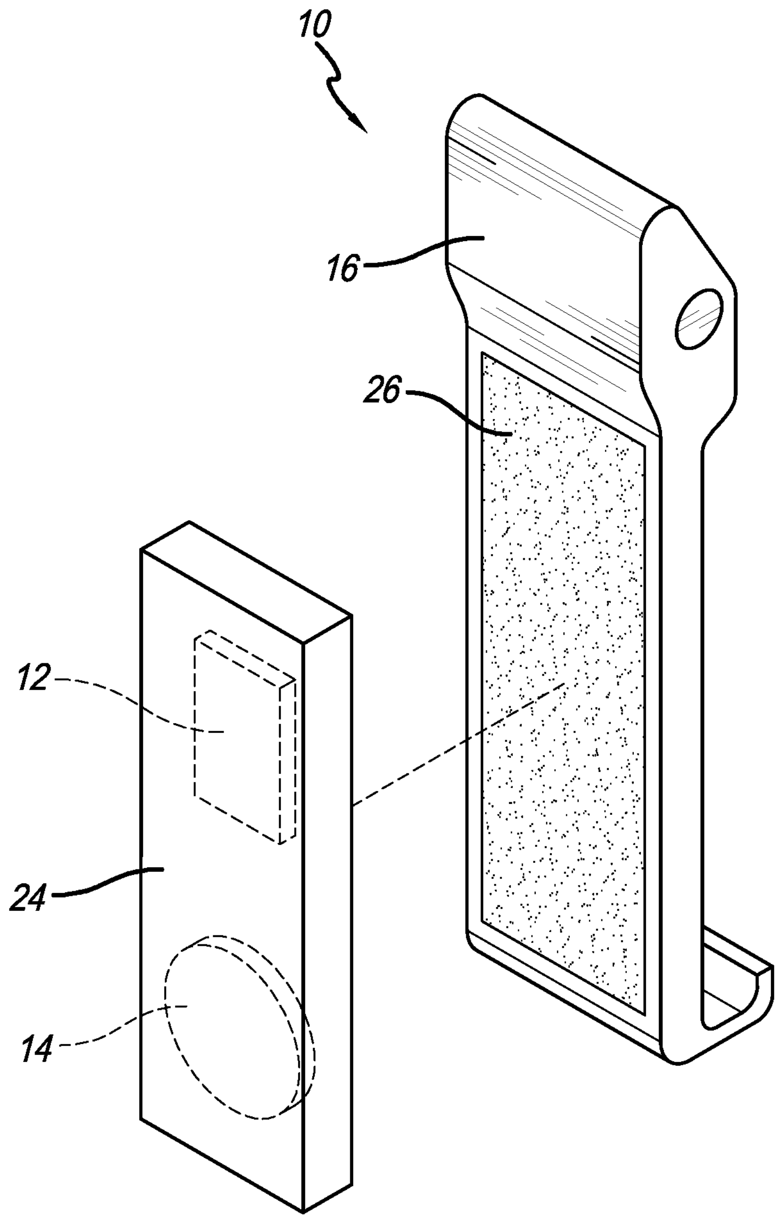
FIG. 5 is an exploded view of a belt clip assembly showing a belt clip with a removable or separable module.

In another embodiment, as shown in FIG. 4, one or more of the battery 14 and chip 12 may be removable from the belt clip 16. See the battery opening or recess 14*a* and chip opening or recess 12*a* in FIG. 4. A button, latch or other mechanism may be included to allow removal of the battery 14 and/or tracking chip or member 12. It will be appreciated that the battery 14 and tracking chip 12 may be one piece or unitary and may or may not be removable. In another embodiment, the battery 14 and tracking chip 12 may be associated with or part of a unit or tracking module 24 that can be secured to, embedded in, inserted into or otherwise attached to the belt clip 16. For example, see FIG. 5, which shows adhesive 26 to which the tracking module 24 can be secured. Any form of attachment is within the scope of the present invention. For example, hook and loop material, adhesive, glue, magnets, snap(s), latch(es) or any other attachment or securing mechanism, material or the like is within the scope of the present invention. The tracking module 24 may be permanently or temporarily attached or secured to the belt clip 16. The module tracking or any part thereof (e.g., the battery 14, tracking chip 12, etc.) may be sold as a kit together with attachment material (e.g., double sided tape, hook and loop material, etc.). For example, a radio user may purchase the kit, add one side of hook and loop material to the belt clip 16 or radio 100 and then secure the tracking module 24, which includes the other side of hook and loop material, to the belt clip 16 or radio 100.

Figure 6:
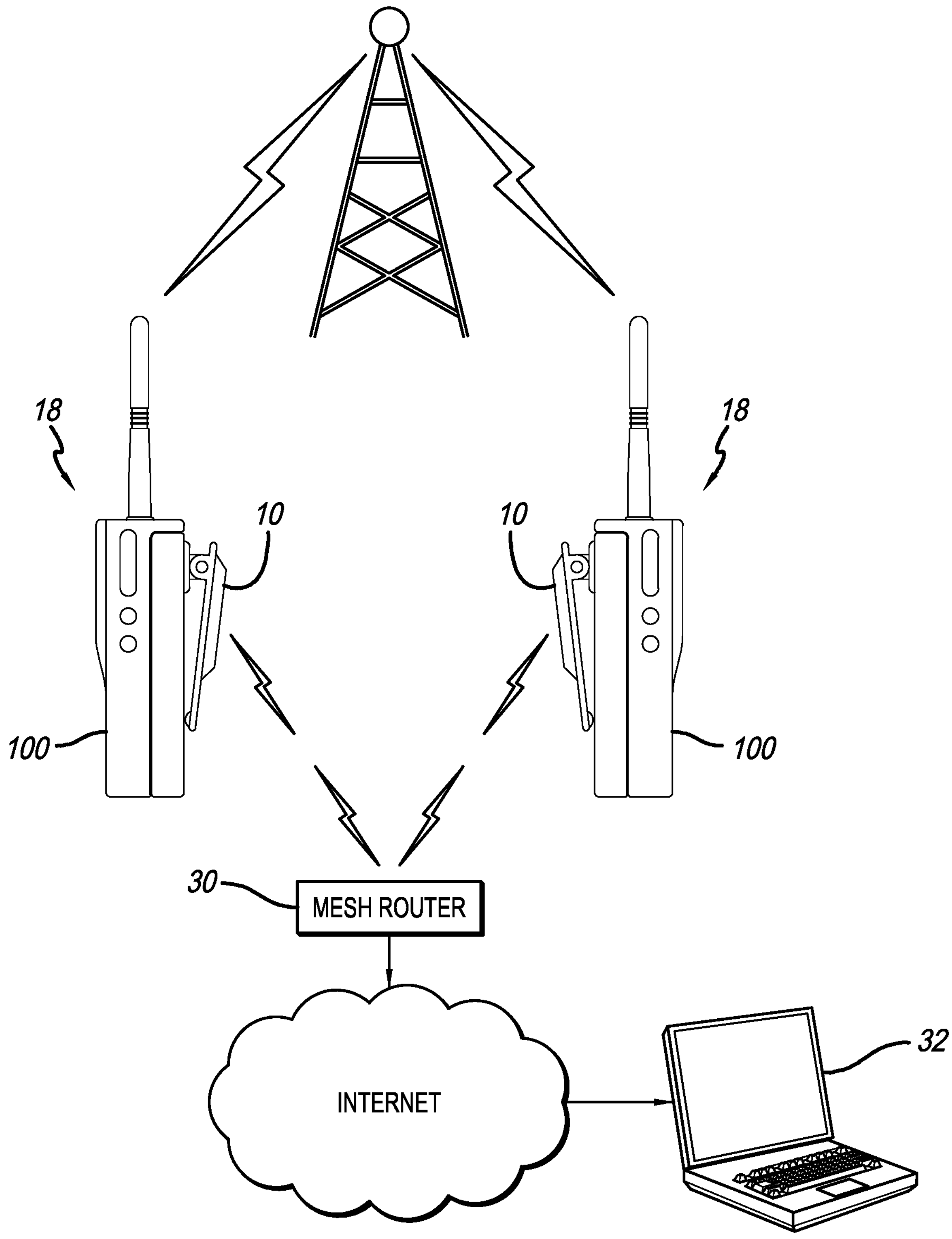
FIG. 6 is a diagram showing an exemplary radio network and tracking network.

FIG. 6 is a diagram showing an exemplary radio network and tracking network, includes first and second radio tracking assemblies 18 and shows the wireless connection between the radios 100 and the radio network and the wireless connection between the tracking chips in the belt clip assemblies 10 and the mesh router. A mesh network is only exemplary. The mesh network includes a mesh router 30, includes the internet and shows a computer 32 on which someone can check the locations of the first and second radio tracking assemblies 18, and, in particular, the tracking chips 12 in the belt clip assemblies 10. It will be appreciated that FIG. 6 is only exemplary and shows two separate networks so that if the batteries in the radios die, the radios can be located or tracked using the tracking chips and the network associated therewith.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A belt clip assembly comprising:

a belt clip configured to be secured to a portable radio, wherein the belt clip includes a tracking chip and a tracking battery associated therewith, wherein the tracking battery powers the tracking chip independently of a radio battery of the portable radio such that the tracking chip remains powered whether the portable radio is powered on or off and whether the radio battery is working or not, and wherein the tracking chip is part of a network such that the belt clip assembly is trackable via the network when the radio battery is dead or the portable radio is powered down.

2. The belt clip assembly of claim 1 wherein the tracking chip and tracking battery are embedded in the belt clip.

3. The belt clip assembly of claim 1 wherein the tracking chip and tracking battery are attached, connected or secured to the belt clip.

4. The belt clip assembly of claim 1 wherein the tracking chip and tracking battery are associated with a tracking module that is attached, connected or secured to a main body portion of the belt clip.

5. The belt clip assembly of claim 4, wherein the tracking module is removable from the main body portion.

6. A radio tracking assembly comprising:

a portable radio that includes a radio battery and a belt clip, wherein the belt clip includes a tracking chip and a tracking battery associated therewith, wherein the tracking battery powers the tracking chip independently of the radio battery such that the tracking chip remains powered whether the portable radio is powered on or off and whether the radio battery is working or not, and wherein the tracking chip is part of a network such that the radio tracking assembly is trackable via the network when the radio battery is dead or the portable radio is powered down.

7. The radio tracking assembly of claim 6 wherein the tracking chip and tracking battery are attached, connected or secured to the belt clip.

8. A radio tracking system comprising:

a first portable radio that includes a first radio battery and a first belt clip, wherein the first belt clip includes a first tracking chip and a first tracking battery associated therewith, a second portable radio that includes a second radio battery and a second belt clip, wherein the second belt clip includes a second tracking chip and a second tracking battery associated therewith, wherein the first and second radios are trackable within a first network, wherein the first and second tracking chips are trackable within a second network, and wherein the first network is different than the second network, wherein the first tracking battery powers the first tracking chip independently of the first radio battery, and the second tracking battery powers the second tracking chip independently of the second radio battery, such that the first and second tracking chips remain powered and trackable within the second network whether the first and second portable radios are powered on or off and whether the first and second radio batteries are working or not.

9. The radio tracking system of claim 8 wherein the first tracking chip and first tracking battery are attached, connected or secured to the first belt clip, and wherein the second tracking chip and second tracking battery are attached, connected or secured to the second belt clip.

* * * * *